United States Patent [19]

Krohn

[11] Patent Number: 4,652,024

[45] Date of Patent: Mar. 24, 1987

[54] TELESCOPING HANDLE AND PRESSURE LIQUID CONDUIT

[75] Inventor: Duane D. Krohn, Westminister, Colo.

[73] Assignee: Graco Inc., Minneapolis, Minn.

[21] Appl. No.: 861,998

[22] Filed: May 12, 1986

[51] Int. Cl.[4] ............................................. F16L 27/12
[52] U.S. Cl. ................................... 285/111; 285/138;
285/302; 285/323; 15/144 B; 239/587; 239/165
[58] Field of Search ............... 285/138, 139, 298, 302,
285/301, 111, 165, 133.1, 322, 323; 239/164,
165, 159, 161, 587; 15/143 R, 143 B, 144 B, 144
R

[56] References Cited

U.S. PATENT DOCUMENTS

| | | | |
|---|---|---|---|
| 1,726,483 | 8/1929 | Giesler | 285/301 |
| 2,402,157 | 6/1946 | Griswold | 285/302 |
| 2,521,127 | 9/1950 | Price | 285/302 |
| 2,832,598 | 4/1958 | Strub | 285/323 |
| 3,354,950 | 11/1967 | Hyde | 285/302 |
| 3,850,453 | 11/1974 | Bentley | 285/138 |
| 4,350,372 | 9/1982 | Logsdon | 285/301 |
| 4,524,484 | 6/1985 | Graham | 15/143 B |

FOREIGN PATENT DOCUMENTS

| | | | |
|---|---|---|---|
| 2448877 | 4/1976 | Fed. Rep. of Germany | 15/144 B |
| 398488 | 3/1909 | France | 285/302 |
| 528359 | 5/1954 | France | 15/143 B |
| 50113 | 10/1965 | Poland | 285/302 |
| 2587 | of 1877 | United Kingdom | 239/165 |

OTHER PUBLICATIONS

Specialty Products Catalog, No. 7, 10/3/1983, pp. 1–8. Disogrin Industries Corp., Part No. 005–018, U–Cup Polyurethane Seal Sample.

Primary Examiner—Cornelius J. Husar
Assistant Examiner—Eric K. Nicholson
Attorney, Agent, or Firm—Paul L. Sjoquist

[57] ABSTRACT

A telescoping handle and liquid pressure conduit concentrically positioned inside the handle, with a liquid seal holder affixed to an outer part of the pressure conduit, and a resilient sealing member in the seal holder to sealingly engage against an inner part of the pressure conduit, so as to permit simultaneous telescoping of the outer handle and the inner pressure conduit.

9 Claims, 2 Drawing Figures

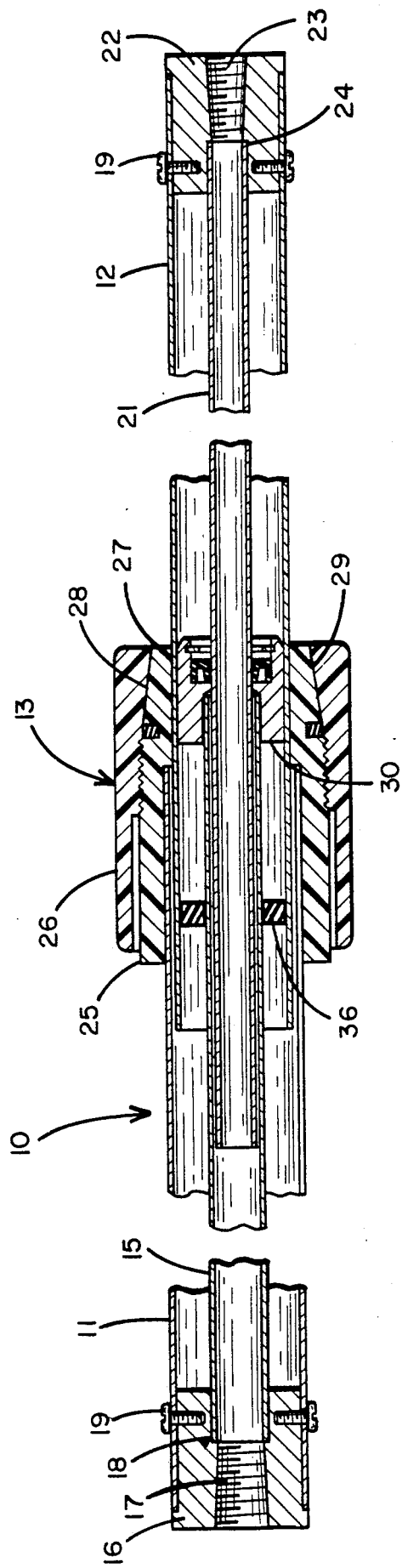
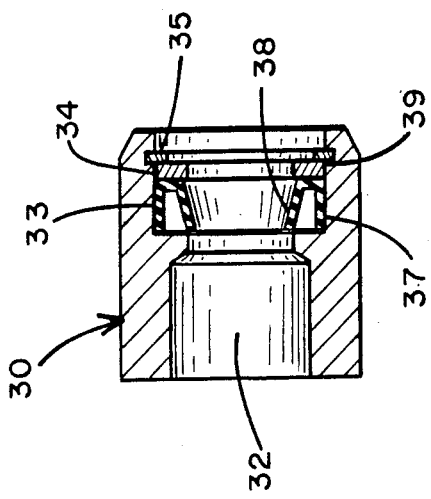
Fig. 1
Fig. 2

TELESCOPING HANDLE AND PRESSURE LIQUID CONDUIT

BACKGROUND OF THE INVENTION

This invention relates to the field of variable-length extension handles, and more particularly to extension handles having the capability of delivering pressurized liquid through a conduit forming a part of the handle.

In the prior art numerous handles are known which allow an operator to apply a liquid to a distant surface. In the earliest manifestation, the only function of the handle was to extend the operator's reach. After each application, the applicator would be returned and re-wet with more liquid.

With the advent of continuous feed applicators, extension handles were adapted to provide a continuous supply of liquid to the applicator, usually by the attachment of a flexible feed hose to the handle, and connecting the hose to deliver liquid to the applicator. Such devices are difficult to maneuver and are susceptible to damage and leakage.

Leakage does not create great difficulties where the liquid is an aqueous cleaning solution for cleaning exterior windows, for example, for the cleaning solution causes nominal harm to the operator and usually is a minor inconvenience.

However, when the liquid is paint or other similar coating material, the potential to cause harm to the operator is increased by the inherent toxicity of the paint. Further, paint spilled about the environment where it is not wanted may cause permanent damage to fixtures such as carpets. Even when no permanent damage is done additional cleanup costs accrue.

Currently it is common to apply liquid at higher pressures, using systems where the delivery pressure approaches 3,000 psi. As pressures are increased the problem of leakage is aggravated since joints and seals have a greater propensity to leak at higher pressures.

A more significant problem is created by the higher pressures making possible leakage to occur in a continuous stream. The high pressure leak can project itself across the environment and impact on a distant surface where leakage is not expected, causing damage to that surface. A serious problem is created by very small pinhole leaks of the liquid from the liquid delivery conduit, such pinhole leaks may eject a stream of liquid so small that the stream cannot be seen by the operator. At these high pressures the liquid stream, rather than simply impacting on the surface of the operator's skin, has sufficient pressure to transgress the skin and inject the liquid inside the operator's body. Virtually all liquids have some toxicity in the human body. The toxicity may be lesser, as when the liquid is nonsterile water, or the liquid may be fatally toxic as with some coating materials inherently having a high level of toxicity.

SUMMARY OF THE INVENTION

The invention includes an inner pressurized telescoping tube for carrying the liquid and a second outer telescoping tube concentric with the inner pressurized tube. The outer tube functions as a handle and safety shield preventing high pressure leakage through the pressure tube wall from contacting the operator.

An object of the invention is to provide an improved extendable safety handle for dispensing pressurized liquid having a safety shield surrounding the pressure conduit protecting the operator from pressure injection of the liquid through the skin into the body. The safety shield further retains liquid leakage minimizing liquid spillage onto the operator or into the environment.

A further object of the invention is to provide an improved extendable safety handle to carry pressurized liquid to an applicator affixed to the distant end of the handle. The handle is telescopically extendable so as to be extended to an appropriate length for application of the liquid to a distant surface.

Another object of the invention is to provide an improved seal between the telescoping segments of the extendable safety handle to minimize leakage between the segments.

A feature of the invention is a sliding seal between the inner telescoping tubes so as the tubes may slide, relative to each other, while minimizing the leakage of liquid therefrom and preventing such leakage from contacting the operator.

The principal advantage of the invention is the increased safety to the operator provided by the safety shield retaining the pressurized liquid so as liquid from pinhole leaks is retained within the safety shield and not pressure injected into the operator's body.

Another advantage of the invention is that by using a safety shield liquids may be dispensed at a higher pressure more safely.

A further advantage of the invention is that by using concentric tubes the rigidity and strength of a large heavy tube is obtained without the added weight associated with such tubes.

Another advantage of the invention is that the handle can be extended to a convenient length and locked at that length.

BRIEF DESCRIPTION OF THE DRAWINGS

FIG. 1 is an overall view of the invention showing the telescoping handle in a cross sectional view.

FIG. 2 is an enlarged sectional view of the seal holder.

DESCRIPTION OF THE PREFERRED EMBODIMENT

Telescoping safety handle 10 is illustrated in FIG. 1. Safety handle 10 is constructed from two telescoping pairs of concentric tubes, the outer safety handle 11 and extension part 12, and the inner conduit 15 and extension conduit 21. The outer safety handle 11 is constructed from a lightweight metallic material, preferably 1 inch O.D. aluminum tubing. The inner conduit 15 is constructed from a pressure resistant metallic material such as brass or stainless steel and preferably has an outside diameter of ½ inch.

The conduit 15 is retained concentric within the safety handle 11 by an end plug 16.

The end plug 16 is constructed from suitable metallic material and has an outside diameter so as to fit snugly within the safety handle 11. The end plug 16 has a central bore having a threaded part 17 and a counterbored part 18. The threaded part 17 has standard size threads, such as ⅛ inch N.P. so it may be readily connected to a source of pressurized liquid. The counterbored part 18 is drilled to a diameter to receive and concentrically locate the conduit 15 and is affixed to the conduit by a suitable means such as brazing or silver solder. The end plug 16 is attached to the safety handle 11 using screws 19, or other suitable fasteners.

The extension part 12 of the outer safety handle is similarly constructed to safety handle 11, of a lightweight metallic material, such as ⅞ inch O.D. aluminum. The inner extension conduit 21 is made from a pressure resistent material, typically 5/16 inch O.D. brass or stainless steel.

An extension end plug 22 is attached at the end of the extension part 12. The extension end plug 22 has an outside diameter along part of its length to fit closely within extension part 12. The extension end plug 22 is attached to extension part 12 by screws 19, or other suitable fasteners. The extension end plug 22 has a central bore having a threaded part 23 and counterbored part 24. The threaded part 23 has standard size threads, such as ⅛ inch N.P. for attachment to an applicator device, such as a roller applicator or spray gun. The counterbored part 24 is bored having a diameter to receive and concentrically locate the inner conduit 21 and is affixed to the conduit 21 by a suitable means, such as brazing or silver solder.

The handle part 11 and the extension part 12 slidingly fit together through a twist lock 13. The twist lock 13 has an inner collet 25 and an outer chuck 26. The collet 25 has an inside diameter to fit about the handle part 11. The collet 25 may be fastened to the handle part 11 by a suitable fastener, or by friction. The collet 25 has jaws 27 to fit about the extension part 12. With the jaws 27 relaxed, the extension part 12 may slide in relation to the jaws.

The chuck 26 fits around the collet 25 and is typically retained there by threads on the mating surfaces. The chuck 26 has an internal bore having a tapered surface 28 engaging a tapered jaw surface 29 to contract the collet jaws 27 to the extension part 12. When the jaws 27 are thus contracted, the extension part 12 is firmly held in one position.

The handle part 11, extension part 12, collet 25 and chuck 26 may be adapted from commercially available extension handles. For example, Specialty Products Company of Greenwood, Mo. manufactures a line of extension handles which may be adapted for incorporating into the present invention. Such handles are made with two, three or four telescoping sections, in lengths ranging from two to thirty-two feet.

The conduit 15 has attached to its end at the twist lock 13 a seal housing 30. The seal housing 30 is a tubular segment having an outside diameter to slidingly fit within the extension part 12 and has a central bore having a diameter to slidingly fit around the inner extension conduit 21. The seal housing 30 is made from a suitable metallic material, such as annealed stainless steel. The seal housing 30 is counterbored at the first end 32 to accept the conduit 15 and is affixed there preferably by brazing or silver solder. The seal housing 30 is counterbored at its second end to receive seal 33, such as a polyurethane "U" cup seal. The seal 33 is longitudinally located, and supported by the seal spacer 34. The seal 33 and the seal spacer 34 are retained within the seal housing 30 by the seal retainer 35. The seal retainer 35 is typically a "C" ring allowing removal and replacement of the seal 33.

Seal 33 may be selected from commercially available components, as for example a polyurethane seal manufactured by Disogrin Industries Corporation, of Manchester, N.H., under part number 005-018.

Extension part 12 has a travel limiter stop 36 affixed to its inner surface near the inner end. The travel limiter stop 36 is circular in shape having a substantially rectangular cross section and has an inside diameter to fit surrounding the inner conduit 15. The travel limiter stop 36 is affixed to the extension part 12 using a suitable fastening means, such as crimping the extension part 12 to retain it.

In its operation, safety handle 10 is attached to a suitable source of pressurized liquid through the threaded part 17 of the handle end plug 16. A suitable applicator, such as a roller or spray gun, is attached to the threaded part 23 of the extension end plug 22. The handle 10 is extended or retracted to a convenient length by loosening the chuck 26 of the twist lock 13 and sliding the extension part 12 in relation to the handle part 11.

When fully retracted, the extension part 12 is telescoped into the handle part 11 where the ends of the extension part 12 abut the handle end plug 16, thereby limiting travel.

The extension part 12 may also be extended to a length where the travel limiter stop 36 contacts the inner end of the seal housing 30 and limits extension. Also, by limiting extension, the travel limiter stop 36 prevents the complete removal of the extension part 12 from the handle part 11

When the pressurized liquid is contained in the handle 10, the pressure forces attempt to extend the extension part 12 to the limit of travel. Without the travel limiter stop 36, the handle 10 would disassemble, spewing pressurized liquid into the environment.

The pressurized liquid flows through the handle end plug 16 and the conduit 15 into the extension conduit 21 and out through the extension plug 22 to an attached applicator. Pressurized liquid is retained within the conduit 15 and the extension conduit 21 by the seal 33 on the seal housing 30. The seal 33 is "U" shaped in cross section and has an outer lip 37 and an inner lip 38 and has a "U" shaped cross-sectional recess 39 between the lips 37, 38. The pressurized liquid will migrate between the conduit 15 and the extension conduit 21 until it reaches the seal 33. As the pressure is transmitted to the "U" shaped recess 39 it causes the outer lip 37 to deform against the walls of the seal housing 30 preventing further migration of the pressurized liquid. The inner lip 38 of the seal 33 will likewise deform against the extension conduit 21 to seal, preventing migration of the liquid from the conduit. Thus, the safety handles 11, 12 surround the pressure carrying conduits 15, 21 and retain any of the pressurized liquid that should leak out of the conduits 15, 21.

Should leakage occur either at the seal 33 or through a pinhole leak developing in the conduit 15 or the extension conduit 21, the liquid collects filling the space between the conduits 15, 21 and the safety handles 11, 12 until the liquid leaks from the collet jaws 27.

Although the present invention has been described in the form of a preferred embodiment having two telescoping sections, it is apparent that the teachings of the invention equally apply to telescoping handles having more than two sections. In such cases it is merely necessary to construct additional sealing connections in the manner described herein at each of the telescoping connections.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scop of the invention.

What is claimed is:

1. A telescoping handle and liquid conduit comprising
    (a) an outer handle having a first tubular part and a second tubular part, the first tubular part having inside dimensions so as to slidingly fit about the second tubular part;
    (b) an inner conduit disposed concentrically within the outer handle having a first conduit part and a second conduit part, the first conduit part having inside dimensions so as to slidingly fit about the second conduit part;
    (c) a seal holder affixed to said first conduit part and having a counterbored end extending over and about said second conduit part, and a resilient sealing member in said counterbore and about said second conduit part;
    (d) a locking means affixed to the first tubular handle part to releasably engage the second tubular handle part, whereby when engaged the second handle part is prevented from sliding relative to the first tubular handle part and when released the second handle part is allowed to sldie relative to the first handle part.
    (e) a cooperative travel limit means affixed to said second tubular part for limiting the telescopic extension of the second tubular part relative to the inner first conduit part, by contacting said seal holder.

2. The telescoping handle of claim 1, wherein the handle tubular parts and the conduit parts are respectively round in cross section.

3. The telescoping handle of claim 1 further comprising an end plug affixed at an end of said first tubular part distal to said locking means, having a central bore to sealingly receive and concentrically locate an end of said first conduit part.

4. The telescoping handle of claim 1 wherein said locking means further comprises a collet that can be tightened against the second tubular part, thereby preventing sliding movement.

5. The telescoping handle of claim 1 wherein said seal holder further comprises a tubular segment.

6. The telescoping handle of claim 5 wherein the tubular segment has outside dimensions so as to slidingly fit within said second tubular part and an inner opening to concentrically locate the second conduit part.

7. The telescoping handle of claim 6 wherein the replaceable sealing member is a U-shaped cup seal.

8. The telescoping handle of claim 1 wherein the cooperative travel limit means further comprises an annular ring affixed to the inside of said second tubular handle part.

9. The telescoping handle of claim 8 wherein said annular ring has an inside diameter to slidingly fit about and concentrically locate the first conduit part.

* * * * *